US008483294B2

United States Patent
Cho et al.

(10) Patent No.: US 8,483,294 B2
(45) Date of Patent: Jul. 9, 2013

(54) METHOD AND APPARATUS FOR TRANSMITTING AND RECEIVING COMMON CONTROL CHANNELS IN A MOBILE COMMUNICATION SYSTEM

(75) Inventors: Joon-Young Cho, Suwon-si (KR); Ying-Yang Li, Beijing (CN); Jianzhong Zhang, Irving, TX (US); Ju-Ho Lee, Suwon-si (KR); Hwan-Joon Kwon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 597 days.

(21) Appl. No.: 12/137,787

(22) Filed: Jun. 12, 2008

(65) Prior Publication Data

US 2009/0003473 A1    Jan. 1, 2009

(30) Foreign Application Priority Data

Jun. 12, 2007 (KR) .................. 10-2007-0057537
Jun. 18, 2007 (KR) .................. 10-2007-0059388

(51) Int. Cl.
  *H04K 1/10* (2006.01)
  *H04L 27/28* (2006.01)
(52) U.S. Cl.
  USPC ........... 375/260; 370/464; 370/480; 370/482; 370/479; 455/59; 455/60; 455/61
(58) Field of Classification Search
  USPC ....................................... 375/260
  See application file for complete search history.

(56) References Cited

U.S. PATENT DOCUMENTS

| 5,954,839 A | 9/1999 | Park et al. |
| 6,377,632 B1 * | 4/2002 | Paulraj et al. ............. 375/299 |
| 7,120,845 B2 | 10/2006 | Kwon et al. |
| 7,778,151 B2 * | 8/2010 | Bertrand et al. .......... 370/208 |

(Continued)

FOREIGN PATENT DOCUMENTS

| RU | 2 294 055 | 2/2004 |
| RU | 2 286 651 | 10/2006 |
| WO | WO 2005/041448 | 5/2005 |
| WO | WO 2005/122458 | 12/2005 |

OTHER PUBLICATIONS

Tanno, M. et al. "Physical Channel Structures and Cell Search Method for Scalable Bandwidth for OFDM Radio Access in Evolved UTRA Downlink.", Wireless Communications and Networking Conference, 2007. Mar. 11-15, 2007.

(Continued)

*Primary Examiner* — Khanh C Tran
*Assistant Examiner* — Gina McKie
(74) *Attorney, Agent, or Firm* — The Farrell Law Firm, P.C.

(57) ABSTRACT

A method and apparatus for transmitting and receiving a common control channel in an Orthogonal Frequency Division Multiplexing (OFDM) mobile communication system. In the transmission apparatus, when a plurality of bursts are transmitted during a Transmission Time Interval (TTI) of the common control channel, an Inverse Fast Fourier Transform (IFFT) mapper generates bursts that are shifted in a frequency domain by applying a predetermined cyclic shift offset between the bursts, and maps the generated bursts in a resource block. A transmission unit transmits the bursts to a receiver. In the reception apparatus, a reception unit receives a burst, and a combining unit combines the received burst with a burst stored in a buffer. A decoder decodes each of the combined bursts, and upon a successful decoding, detects a TTI start timing of the common control channel from the successfully decoded burst.

12 Claims, 19 Drawing Sheets

U.S. PATENT DOCUMENTS

| | | | |
|---|---|---|---|
| 7,792,212 B2 * | 9/2010 | Lee et al. | 375/295 |
| 2004/0194007 A1 * | 9/2004 | Hocevar | 714/801 |
| 2005/0232181 A1 * | 10/2005 | Park et al. | 370/319 |
| 2005/0248873 A1 * | 11/2005 | Coker et al. | 360/75 |
| 2007/0253465 A1 * | 11/2007 | Muharemovic et al. | 375/130 |
| 2008/0080472 A1 * | 4/2008 | Bertrand et al. | 370/344 |
| 2008/0168114 A1 * | 7/2008 | Han et al. | 708/209 |
| 2008/0175337 A1 * | 7/2008 | Cheng | 375/317 |
| 2009/0181692 A1 * | 7/2009 | Gaal et al. | 455/452.2 |
| 2009/0249027 A1 * | 10/2009 | Kim et al. | 712/5 |
| 2010/0002573 A1 * | 1/2010 | Baldemair et al. | 370/210 |
| 2010/0041350 A1 * | 2/2010 | Zhang et al. | 455/101 |
| 2010/0067461 A1 * | 3/2010 | Kwak et al. | 370/329 |
| 2011/0013715 A1 * | 1/2011 | Lee et al. | 375/285 |

OTHER PUBLICATIONS

NTT DoCoMo, R1-060163, "Cell Search Method in Connected and Idle Mode for E-UTRA Downlink.", 3GPP TSG-RAN WG1 LTE Ad Hoc Meeting, Jan. 23-25, 2006.

* cited by examiner

METHOD AND APPARATUS FOR TRANSMITTING AND RECEIVING COMMON CONTROL CHANNELS IN A MOBILE COMMUNICATION SYSTEM

PRIORITY

This application claims priority under 35 U.S.C. §119(a) to a Korean Patent Application filed in the Korean Intellectual Property Office on Jun. 12, 2007, and assigned Serial No. 2007-57537, and a Korean Patent Application filed in the Korean Intellectual Property Office on Jun. 18, 2007, and assigned Serial No. 2007-59388, the disclosures of which are incorporated herein by reference.

BACKGROUND OF THE INVENTION

1. Field of the Invention

The present invention relates generally to a communication method and apparatus for a downlink in a mobile communication system, and in particular, to a communication method and apparatus for transmitting and receiving common control channels in a mobile communication system.

2. Description of the Related Art

Recently, Orthogonal Frequency Division Multiplexing (OFDM) technology is widely being applied as a technology for broadcasting and mobile communication systems. OFDM technology cancels interference between multi-path signal components existing in mobile communication channels, and ensures orthogonality between multi-access users. In addition, OFDM technology enables efficient use of frequency resources, making it a technology suitable for high-speed data transmission and broadband systems.

FIG. 1 illustrates a structure of an OFDM signal in time and frequency domains. Referring to FIG. 1, one OFDM symbol 100 includes N subcarriers 102 in terms of the frequency domain. Individual modulation symbols 104 of transmission information are simultaneously carried on each of the subcarriers 102 in parallel. As stated above, OFDM technology, a multi-carrier transmission technology, can carry transmission data and control channel information on several subcarriers on a distributed basis for parallel transmission.

In FIG. 1, reference numerals 106 and 108 indicate start points of $i^{th}$ and $(i+1)^{th}$ OFDM symbols, respectively. In an OFDM-based mobile communication system, each physical channel is composed of one or more subcarrier symbols 104. One subcarrier interval within one OFDM symbol interval is called a "Resource Element (RE) 106" herein.

In the mobile communication system, for demodulation of received data and control information, synchronization and a cell search should first be established between a transmitter and a receiver. The downlink synchronization and cell search process refers to a process of determining a frame start point of physical channels transmitted from a cell to which a User Equipment (UE) belongs, and determining a cell-specific scrambling code applied during transmission of the physical channels. This process is referred to herein as a "cell search process", for short. The cell search process performed by detecting a downlink Synchronization Channel (SCH) code by a UE. The UE acquires synchronization between a transmitter and a receiver and a cell Identifier (ID) for demodulation of data and control information through the cell search process.

The UE, after a success cell search, decodes a Broadcasting Channel (BCH), which is a common control channel for transmission of system information. The UE obtains system information for the cell through reception of the BCH. The system information includes information necessary for transmitting and/or receiving data channels and other control channels, such as cell ID, system bandwidth, channel setup information, etc.

FIG. 2 illustrates an OFDM-based downlink frame structure of Enhanced Universal Terrestrial Radio Access (EUTRA), which is a standard for the next generation mobile communication technology of the $3^{rd}$ Generation Partnership Project (3GPP), and transmission points of synchronization channels.

As illustrated in FIG. 2, a 10-ms radio frame 200 includes 10 subframes 206, each of which includes 2 slots. Generally, 7 OFDM symbols 205 are formed in one slot 201. In the downlink, SCH is classified into two types: Primary Synchronization Channel (P-SCH) 203 and Secondary Synchronization Channel (S-SCH) 204. The SCHs are transmitted in the last two OFDM symbol intervals within the slots 201 and 202.

Similarly, the BCH carrying system information is also classified into a Primary BCH (P-BCH) and a Dynamic BCH (D-BCH). The P-BCH, a channel that a UE first receives from the SCHs after initial cell search, transmits the core system information that the UE must receive before the D-BCH.

However, most system information transmitted on the P-BCH is generally the type of information that rarely changes over time, and a Transmission Time Interval (TTI) of the P-BCH can be greater than a timing of a frame 200, the synchronization of which the UE acquires by means of the SCH. The term "TTI" as used herein is a period in which a channel coding block generated by channel-coding information transmitted on the P-BCH is transmitted. For example, although 10-ms frame synchronization is acquired through the SCH-based cell search, the channel coding block of P-BCH may be 40-ms TTI long as it is transmitted over 4 frames. In this case, the UE should acquire even a timing of the 40-ms TTI in order to normally decode the P-BCH. Therefore, there is a demand for a common control channel transmission and/or reception method and apparatus capable of acquiring a timing of the P-BCH and decoding P-BCH information with low complexity, even when a TTI of common control channels is greater than an interval of frame synchronization acquired through synchronization channels in the mobile communication system.

SUMMARY OF THE INVENTION

Therefore, the present invention has been designed to address at least the problems and/or disadvantages described above, and to provide at least the advantages described below. Accordingly, an aspect of the present invention is to provide a common control channel transmission and reception method and apparatus for acquiring synchronization of common control channels and decoding the synchronization-acquired common control channels in a mobile communication system.

Another aspect of the present invention is to provide a common control channel transmission and reception method and apparatus for acquiring a TTI start timing of a common control channel, when a TTI of the common control channel is greater than an interval of frame synchronization acquired through a synchronization channel in a mobile communication system.

Another aspect of the present invention is to provide a common control channel transmission and reception method and apparatus for acquiring frame synchronization for a common control channel with a small-sized soft-combining buffer and with low calculation complexity at a UE receiver in a mobile communication system.

In accordance with an aspect of the present invention, there is provided a method for transmitting a common control channel in an Orthogonal Frequency Division Multiplexing (OFDM) mobile communication system. The method includes, when a plurality of bursts are transmitted during a Transmission Time Interval (TTI) of the common control channel, generating bursts that are shifted in a frequency domain by applying a predetermined cyclic shift offset between the bursts; and transmitting the shifted bursts to a receiver.

In accordance with another aspect of the present invention, there is provided a method for receiving a common control channel in an Orthogonal Frequency Division Multiplexing (OFDM) mobile communication system. The method includes receiving a burst; applying an inverse cyclic shift to the received burst and combining the received burst with a burst received in a previous frame; decoding the combined bursts; and upon a successful decoding, detecting a Transmission Time Interval (TTI) start timing of a common control channel from a cyclic shift value.

In accordance with another aspect of the present invention, there is provided an apparatus for transmitting a common control channel in an Orthogonal Frequency Division Multiplexing (OFDM) mobile communication system. The apparatus includes an Inverse Fast Fourier Transform (IFFT) mapper for, when a plurality of bursts are transmitted during a Transmission Time Interval (TTI) of the common control channel, generating bursts that are shifted in a frequency domain by applying a predetermined cyclic shift offset between the bursts, and mapping the generated bursts in a resource block; and a transmission unit for transmitting the mapped bursts to a receiver.

In accordance with another aspect of the present invention, there is provided an apparatus for receiving a common control channel in an Orthogonal Frequency Division Multiplexing (OFDM) mobile communication system. The apparatus includes a reception unit for receiving a burst; a combining unit for combining the received burst with a burst stored in a buffer; and a decoder for decoding each of the combined bursts, and upon a successful decoding, detecting a TTI start timing of the common control channel from the successfully decoded burst.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operator intention or usual practices. Therefore, the definition of the terms should be made based on contents throughout the specification.

The present invention, as described below, is directed to providing a method and apparatus for acquiring a TTI start timing of P-BCH when a TTI of the P-BCH is greater than an interval of frame synchronization acquired through SCH, like the P-BCH in the EUTRA standard.

Figure 1:
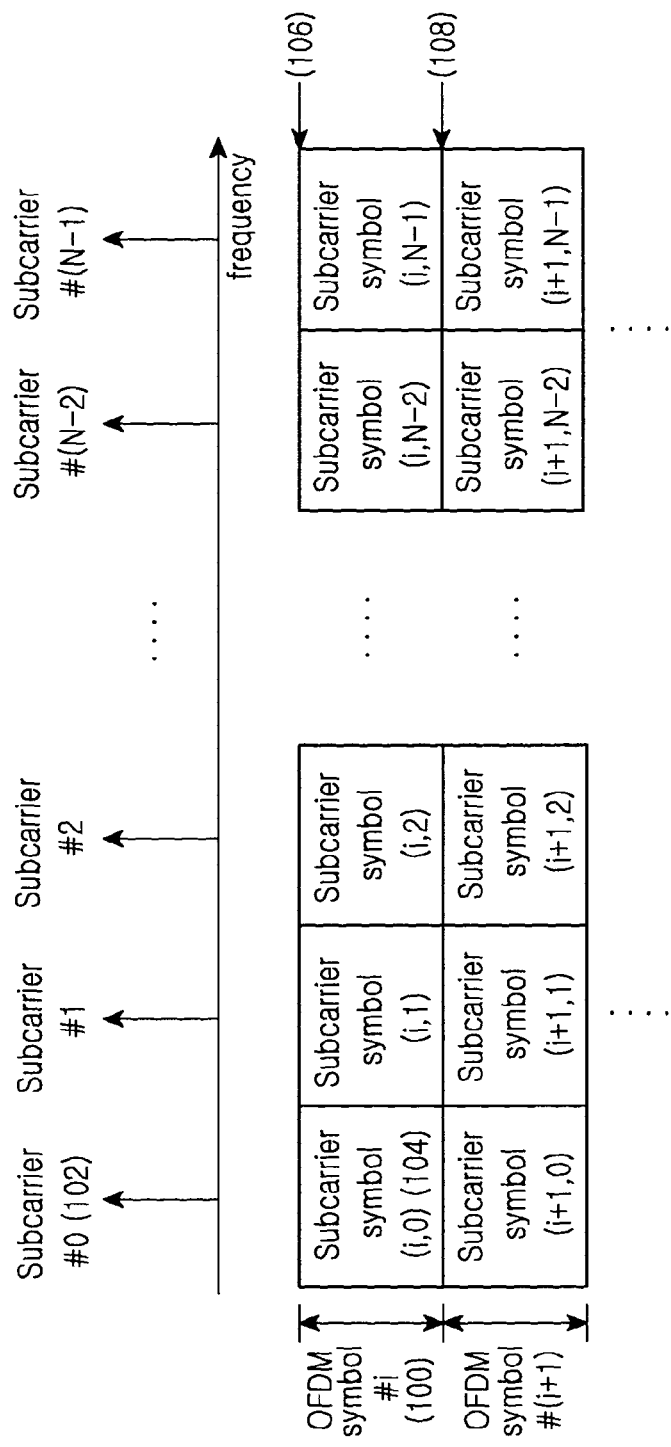
FIG. 1 is a diagram illustrating a structure of an OFDM transmission signal in time and frequency domains.
Figure 2:
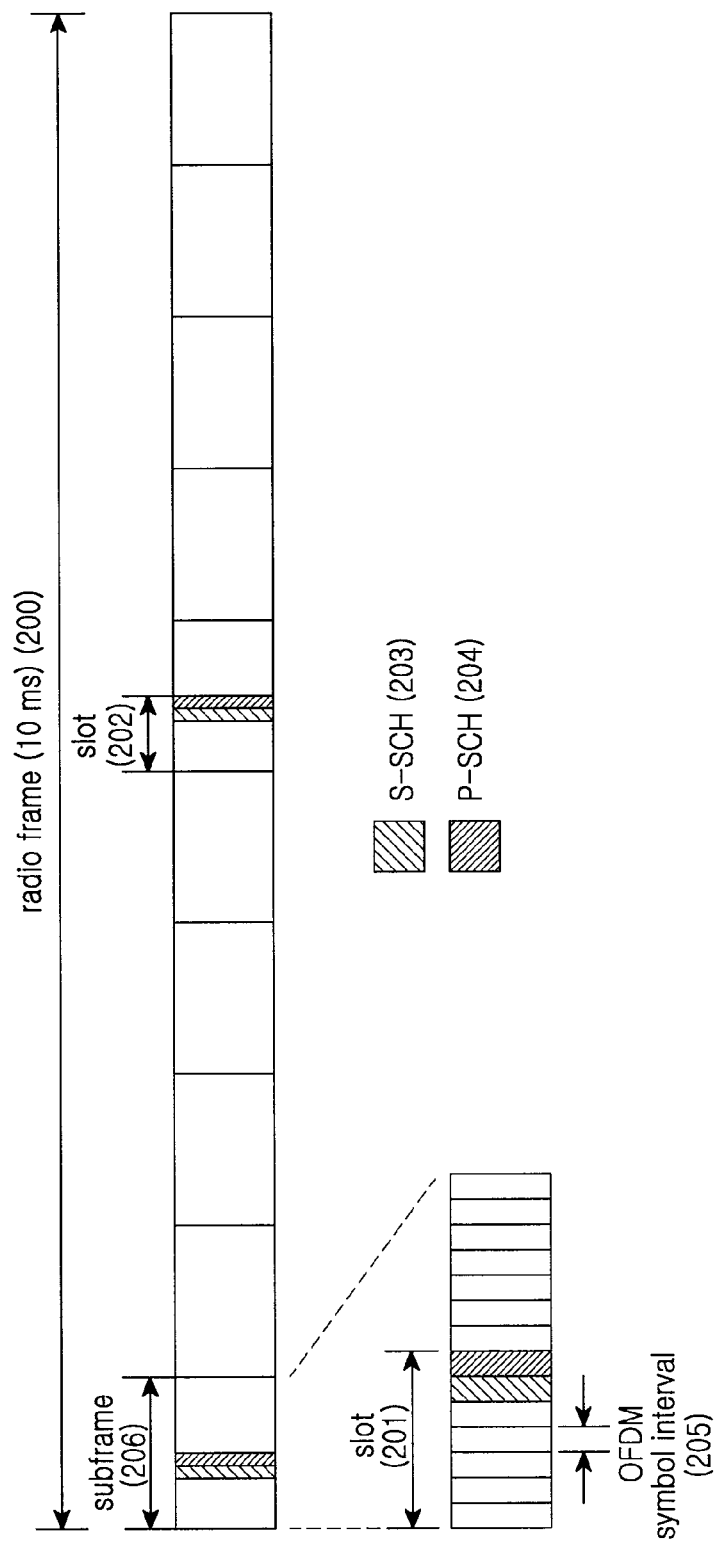
FIG. 2 is a diagram illustrating a EUTRA downlink frame structure and synchronization channel mapping.
Figure 3:
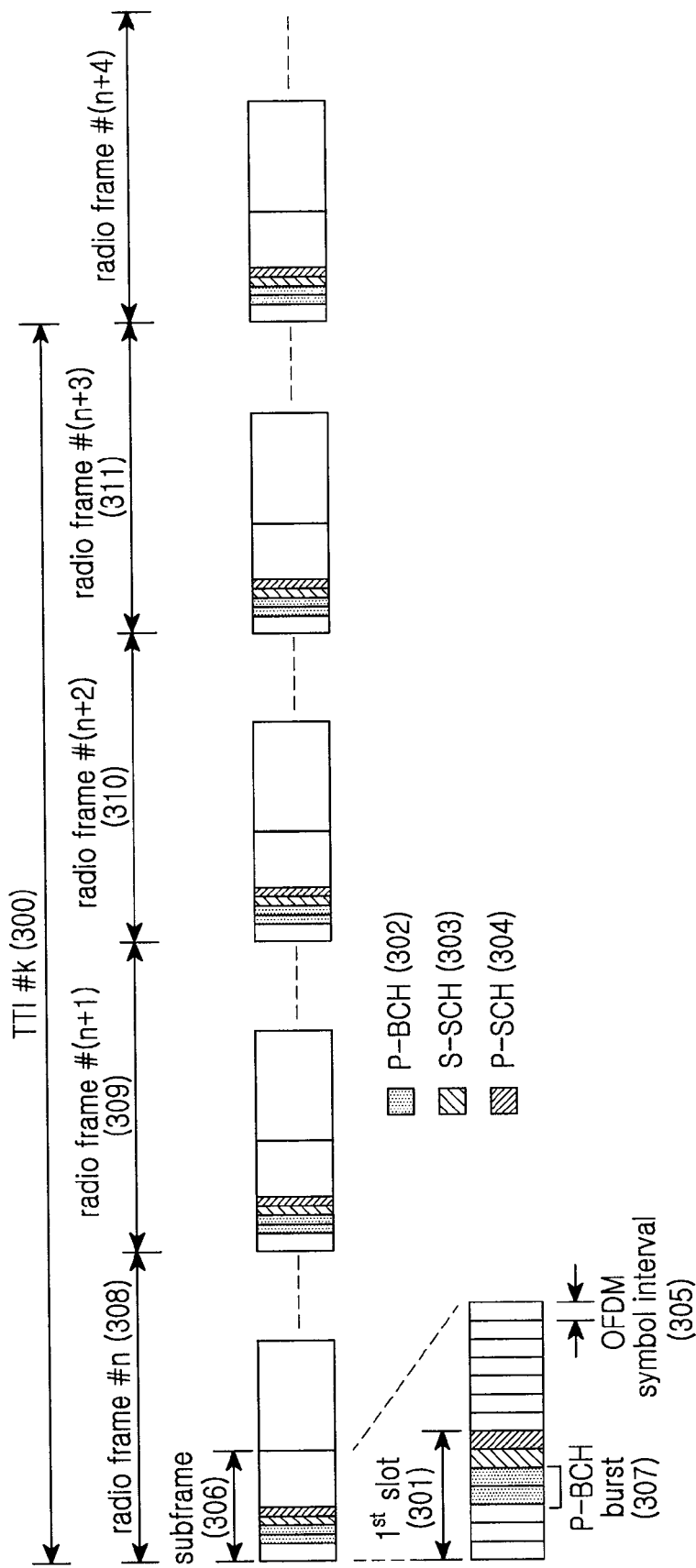
FIG. 3 is a diagram illustrating a P-BCH and an SCH being mapped in a downlink frame.

Although a detailed description of the present invention will be given herein with reference to the OFDM-based mobile communication system, by way of example, it will be understood by those skilled in the art that the present invention can be applied even to other communication systems having the similar technical background and channel format, with a slight modification, without departing from the spirit and scope of the present invention FIG. 3 is a diagram illustrating a P-BCH and an SCH being mapped in a downlink frame. More specifically, FIG. 3 illustrates a state where a P-BCH with a 40-ms TTI 300 is repeatedly transmitted with four bursts 307 at intervals of 10-ms frames 308, 309, 310, and 311.

In an initial cell search, P-SCH 304 and S-SCH 303 for a 10-ms frame synchronization acquisition are transmitted in the sixth and seventh OFDM symbol periods of the first slot 301 in the frame, and P-BCH 302 is transmitted in the fourth and fifth OFDM symbol periods in the first slot 301. In this state, a UE acquires 10-ms frame synchronization from the P-SCH 304 and S-SCH 303. However, synchronization for a 40-ms TTI start point of P-BCH should be additionally acquired through the P-BCH.

As illustrated in FIG. 3, when, for example, four same P-BCH bursts are transmitted at 10-ms periods during a TTI, the UE attempts decoding on the P-BCH every 10 ms. In this case, the UE attempts a timing detection for four hypotheses corresponding to timings 308, 309, 310, and 311 of four bursts in the 40-ms TTI. In case of a failure, the UE reattempts the decoding in the next 10 ms. At this point, the UE soft-combines the burst received in the previous frame with the currently received burst to improve a received burst's Signal-to-Noise Ratio (SNR), and then attempts decoding thereon. Because there are four timing hypotheses in this process, there is a need for separate buffers for the four timing hypotheses in the general case.

One of the key characteristics of the present invention is to map modulation symbols of P-BCH bursts to an RE 106 by applying a predetermined cyclic shift offset between the bursts to easily detect the TTI timing when several P-BCH bursts are transmitted during TTI of the P-BCH as stated above. In particular, if the predetermined cyclic shift offset is applied between the bursts in this way, the UE, in the process of attempting TTI timing detection and P-BCH burst decoding for the P-BCH, needs only one soft buffer at its reception apparatus, compared to the conventional method which requires multiple buffers, and can perform the above process with low calculation complexity.

A detailed description will now be made of a P-BCH transmission method and apparatus proposed by the present invention through the following embodiments.

Figure 4:
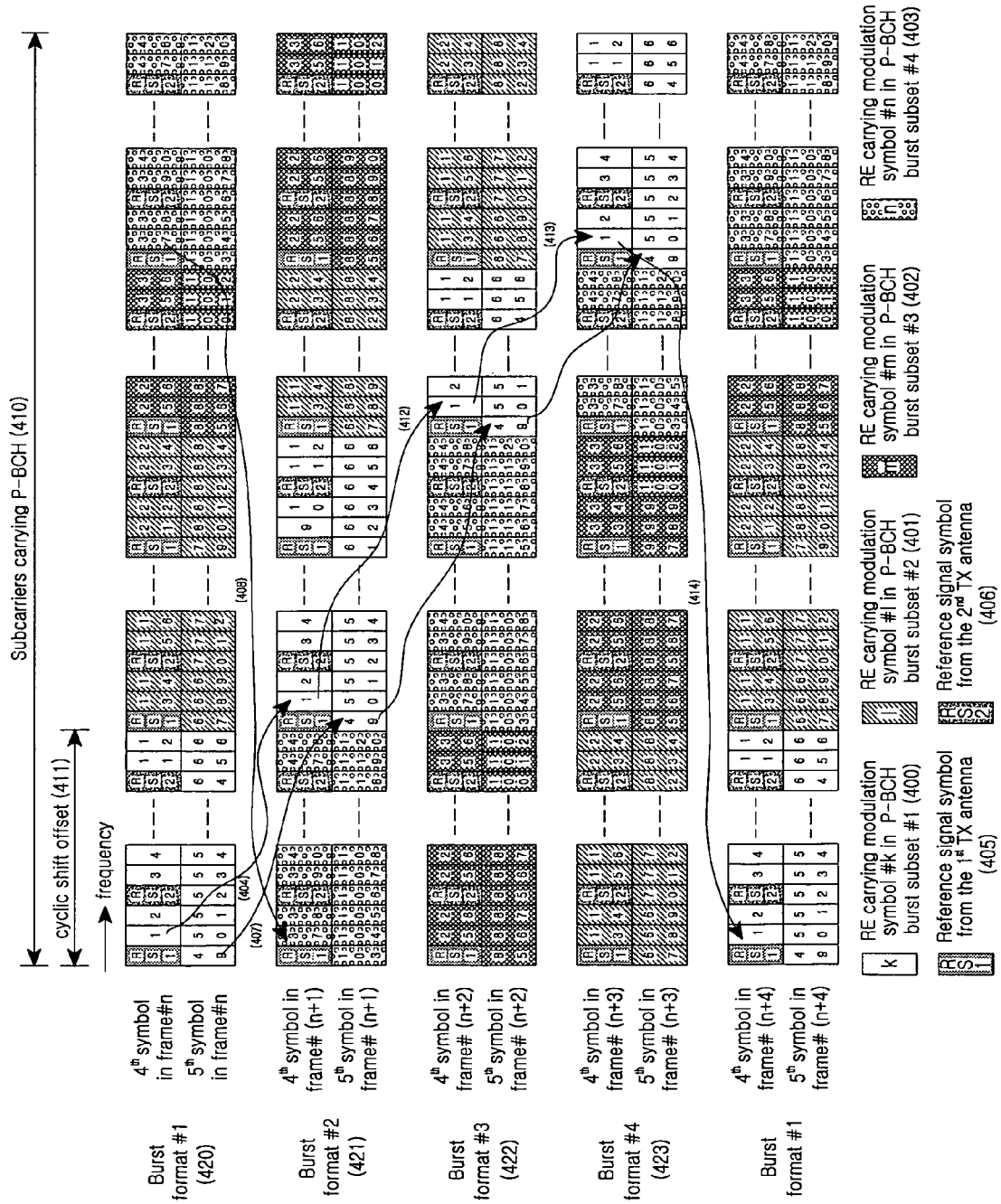
FIG. 4 is a diagram illustrating a cyclic shift being applied between P-BCH bursts according to a first embodiment of the present invention.

FIG. 4 is a diagram illustrating a cyclic shift being applied between P-BCH bursts according to a first embodiment of the present invention. It is assumed in FIG. 4 that a P-BCH is transmitted in the fourth and fifth OFDM symbol intervals of every frame, as illustrated in FIG. 3, and is transmitted using 72 subcarriers 410 in each OFDM symbol. The REs carrying P-BCH modulation symbols should not necessarily include consecutive subcarriers, and subcarriers used between the OFDM symbols should also not necessarily be equal.

Further, FIG. 4 illustrates a collection made by gathering REs used for transmission of modulation symbols of a P-BCH in each OFDM symbol. In addition, Reference signal Symbol 1 (RS1) 405 and RS2 406 are REs carrying pilot symbols transmitted from the first and second antennas of a base station (also known as a Node B), respectively.

In FIG. 4, REs used for transmission of one P-BCH burst are divided into four subsets 400, 401, 402, and 403, each of which includes the same number of REs. Therefore, in one OFDM symbol period, the subsets each include 18 subcarriers. One of the most outstanding characteristics of the P-BCH burst transmission structure illustrated in FIG. 4 is in that the P-BCH bursts are transmitted after being shifted in the frequency domain by a predetermined cyclic shift offset 411 between consecutive frames.

In the example illustrated in FIG. 4, because P-BCH bursts include 72 subcarriers in one OFDM symbol period, they undergo cyclic shift at intervals of 18 subcarriers. Therefore, while the subsets are mapped in a subframe #n in order of subset #1 400, subset #2 401, subset #3 402, and subset #4 403 in the frequency domain, the subsets are mapped in a subframe #(n+1) in order of subset #4 403, subset #1 400, subset #2 401, and subset #3 402 in the frequency domain after undergoing right cyclic shift by 18 subcarriers. As a result, a P-BCH modulation symbol #1 of the subframe #n is mapped in the subframe #(n+1) to an RE right-shifted by 18 subcarriers in the same OFDM symbol period as indicated by reference numeral 404. Similarly, a P-BCH modulation symbol #49 is also mapped after being shifted by 18 subcarriers between the subframe #n and the subframe #(n+1) as indicated by reference numeral 407. A modulation symbol #37 is also mapped to a second RE from the left, after undergoing a right cyclic shift by 18 subcarriers as indicated by reference numeral 408. Through this mapping, the P-BCH burst turns back to a burst format #1 420 at a start point of the next TTI. That is, because a cyclic shift offset of 18 subcarriers is applied between bursts, the start frame of every TTI undergoes a cyclic shift in order of burst format #1 420, format #2 421, format #3 422, format #4 423, and format #1 420.

The cyclic shift of a constant offset occurs between consecutive P-BCH bursts as illustrated in FIG. 4. Therefore, for example, the modulation symbol #1 is mapped to an RE after right-shifted between bursts by 18 subcarriers as indicated by reference numerals 404, 412, 413 and 414.

Figure 5:
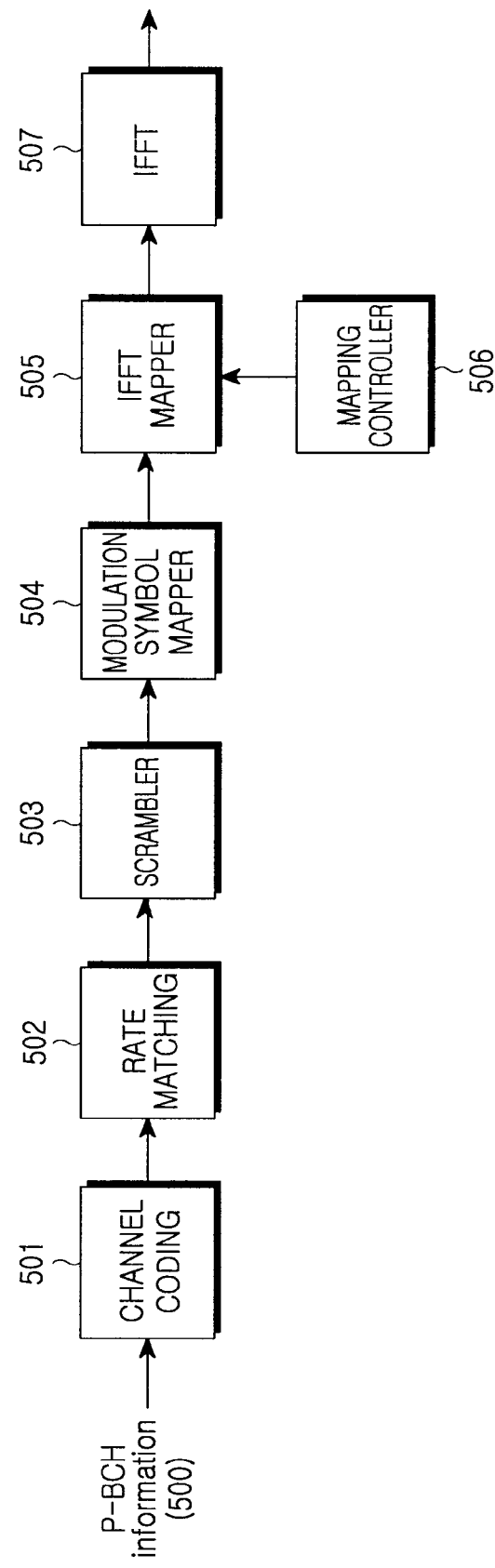
FIG. 5 is a diagram illustrating a structure of a base station transmission apparatus according to the first embodiment of the present invention.

FIG. 5 is a diagram illustrating a structure of a base station transmission apparatus according to the first embodiment of the present invention. Referring to FIG. 5, a channel coding unit 501 performs channel coding on input P-BCH information 500, and a rate matching unit 502 outputs code symbols that underwent rate matching according to the number of REs to which P-BCH bursts will be mapped. A scrambler 503 multiplies the code symbols by a cell-specific or base station-specific scrambling sequence, and then outputs scrambled code symbols.

A modulation symbol mapper 504 maps the scrambled code symbols to modulation symbols. When Quadrature Phase Shift Keying (QPSK) modulation is applied, two code symbols forms one modulation symbol. An Inverse Fast Fourier Transform (IFFT) mapper (or Burst to IFFT mapper) 505 maps the modulation symbols to REs where a P-BCH is transmitted. A mapping controller 506 applies a cyclic shift according to the burst position of the currently transmitted P-BCH in a TTI, and maps the corresponding symbols to inputs of an Inverse Fast Fourier Transformer (IFFT) 507. The IFFT 507 performs Inverse Fast Fourier Transform on channel symbols different from the P-BCH symbols before transmission.

Figure 6:
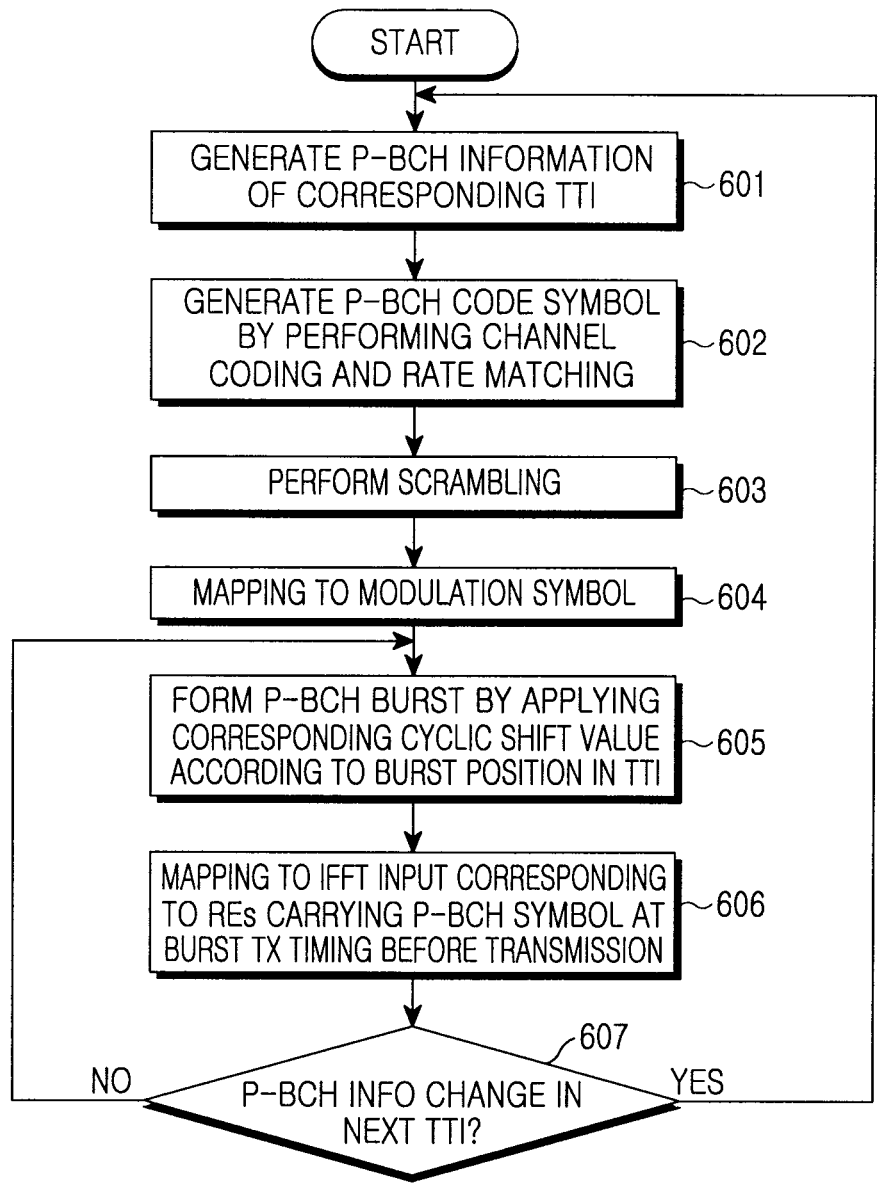
FIG. 6 is a flowchart illustrating a transmission procedure of a base station according to the first embodiment of the present invention.

FIG. 6 is a flowchart illustrating a transmission procedure of a base station according to the first embodiment of the present invention. In step 601, a base station generates P-BCH information it will transmit in a corresponding TTI. In step 602, the base station performs channel coding and rate mapping on the P-BCH, generating code symbols it will transmit with P-BCH bursts. In step 603, the base station multiplies the code symbols by a cell-specific or base station-specific scrambling sequence in order to scramble them. Because the scrambling step is not the main focus of the present invention, it may be followed by step 606 or omitted. In step 604, the base station maps the scrambled code symbols to the modulation symbols. In step 605, the base station applies a corresponding cyclic shift offset to the modulation symbols according to the position of the currently transmitted burst in the TTI, generating P-BCH bursts. For example, referring to FIG. 4, when the currently transmitted burst is the second burst in TTI, the base station generates cyclic shift-applied bursts like in the burst format #2 421 in step 605. In step 606, the base station maps the generated bursts to IFFT inputs corresponding to the REs carrying P-BCH symbols at a burst transmission OFDM symbol timing. In step 607, the base station determines whether there is any change in P-BCH information in the next TTI. If there is a change, the base station returns to step 601, and if there is no change, the base station returns to step 605 to generate bursts corresponding to the relevant frame timing.

Figure 7:
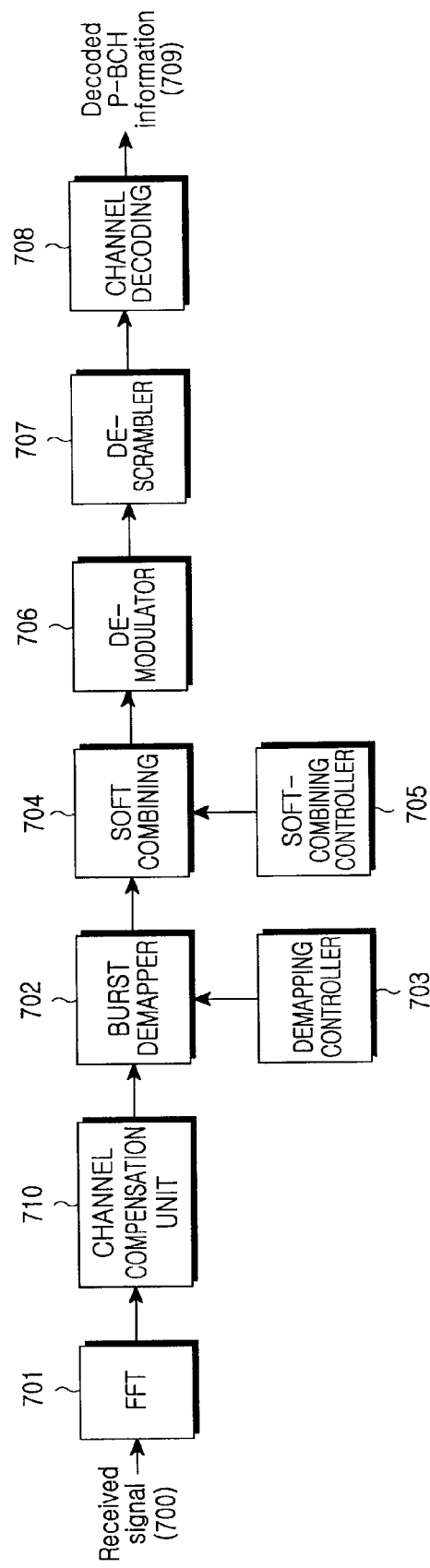
FIG. 7 is a diagram illustrating a structure of a UE reception apparatus according to the first embodiment of the present invention.

FIG. 7 illustrates a structure of a UE reception apparatus according to the first embodiment of the present invention. Referring to FIG. 7, a Fast Fourier Transformer (FFT) 701 performs Fast Fourier Transform on a received OFDM signal 700, to output symbols carried on subcarriers in the OFDM symbol period. A channel compensation unit 710 performs channel compensation after performing channel estimation on the symbols from the pilot signal. A burst demapper 702, under the control of a demapping controller 703, applies inverse cyclic shift to the bursts received in the current frame in order to match them with the bursts received in the previous frame in terms of modulation symbol mapping, so that they can undergo soft combining.

A soft-combining unit (or soft-combining of bursts) 704 performs soft combining between the received bursts. At this point, under the control of a soft-combining controller 705, the previously stored bursts can be cleared. A demodulator 706 outputs code symbols from the soft-combined modulation symbols, and a descrambler 707 performs descrambling on the code symbols. A channel decoding unit 708 performs decoding on the descrambled received bursts, and obtains P-BCH burst information bits 709, when it has successfully decoded.

Figure 8:
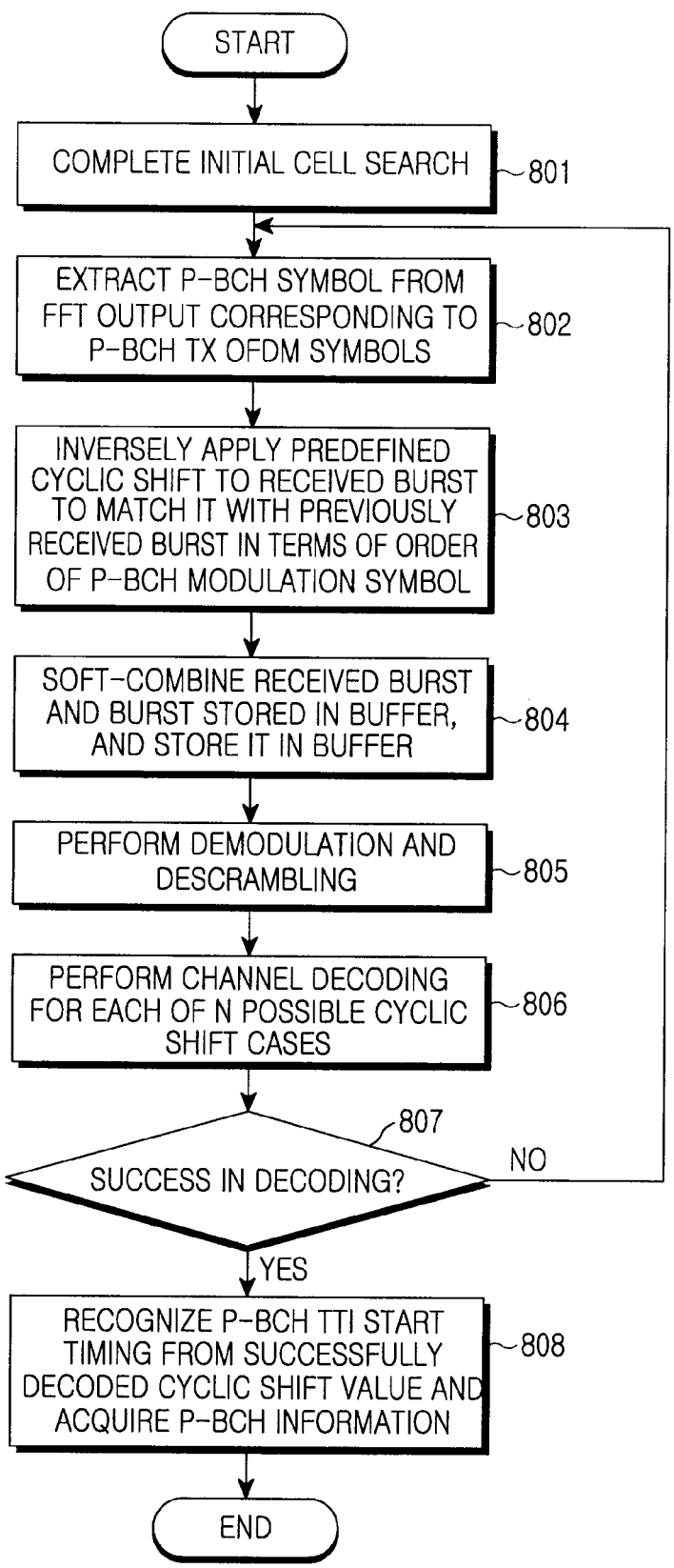
FIG. 8 is a flowchart illustrating a reception procedure of a UE according to the first embodiment of the present invention.

FIG. 8 is a flowchart illustrating a reception procedure of a UE according to the first embodiment of the present invention. After a UE has completed an initial cell search in step 801, the UE extracts, in step 802, P-BCH symbols from corresponding FFT outputs at an OFDM symbol timing where it transmits P-BCH bursts. In step 803, the UE inversely applies the predefined cyclic shift to the currently received bursts to match them with the previously received bursts in terms of orders of P-BCH modulation symbols. Therefore, in step 804, the UE soft-combines the currently received bursts with the bursts previously stored in the buffer, and then stores the soft-combined bursts in the buffer. Thereafter, in step 805, the UE performs demodulation on the soft-combined bursts to obtain code symbols, and performs descrambling thereon. In step 806, the UE performs channel decoding on the soft-combined bursts for each of N possible cyclic shift cases (offsets). In the case illustrated in FIG. 4, because there are four possible cyclic shifts (cyclic shift offsets) of 0, 18, 36, and 72, N=4. That is, the UE performs channel decoding on the descrambled soft-combined bursts for each of four hypotheses of burst formats #1 420, #2 421, #3 422, and #4 423 illustrated in FIG. 4. Thus, in step 807, the UE determines whether it has successfully decoded. The UE, if it has successfully decoded, determines in step 808 the position of the currently received burst in TTI depending on for which burst format it has successfully decoded, and acquires P-BCH information. For example, if the UE has successfully decoded the hypothesis of the burst format #1 421 in step 806, the currently received bursts belong to the second frame in the P-BCH TTI. That is, the UE has inversely applied a predetermined cyclic shift to the bursts received in the current frame and soft-combined them with the bursts previously stored in the buffer in step 803. However, if the UE has failed in the decoding in step 807, the process returns to step 802 to repeat the foregoing process.

Figure 9:
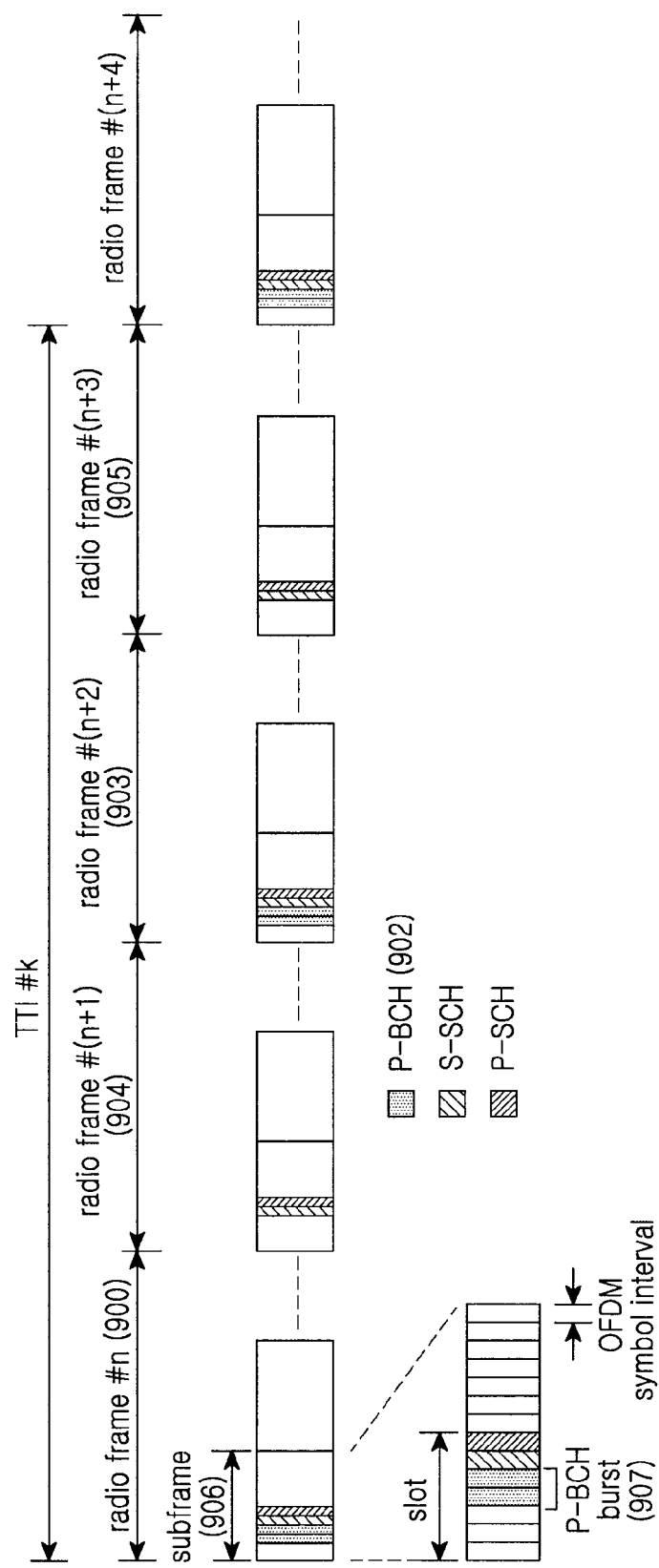
FIG. 9 is a diagram illustrating a P-BCH and an SCH being mapped in a downlink frame according to a second embodiment of the present invention.

FIG. 9 is a diagram illustrating a P-BCH and an SCH being mapped in a downlink frame according to a second embodiment of the present invention. Unlike the mapping illustrated in FIG. 3, FIG. 9 illustrates a case where P-BCH bursts are transmitted only in the first and third frames 900 and 903 in TTI, and are not transmitted in the second and fourth frames 904 and 905.

Figure 10:
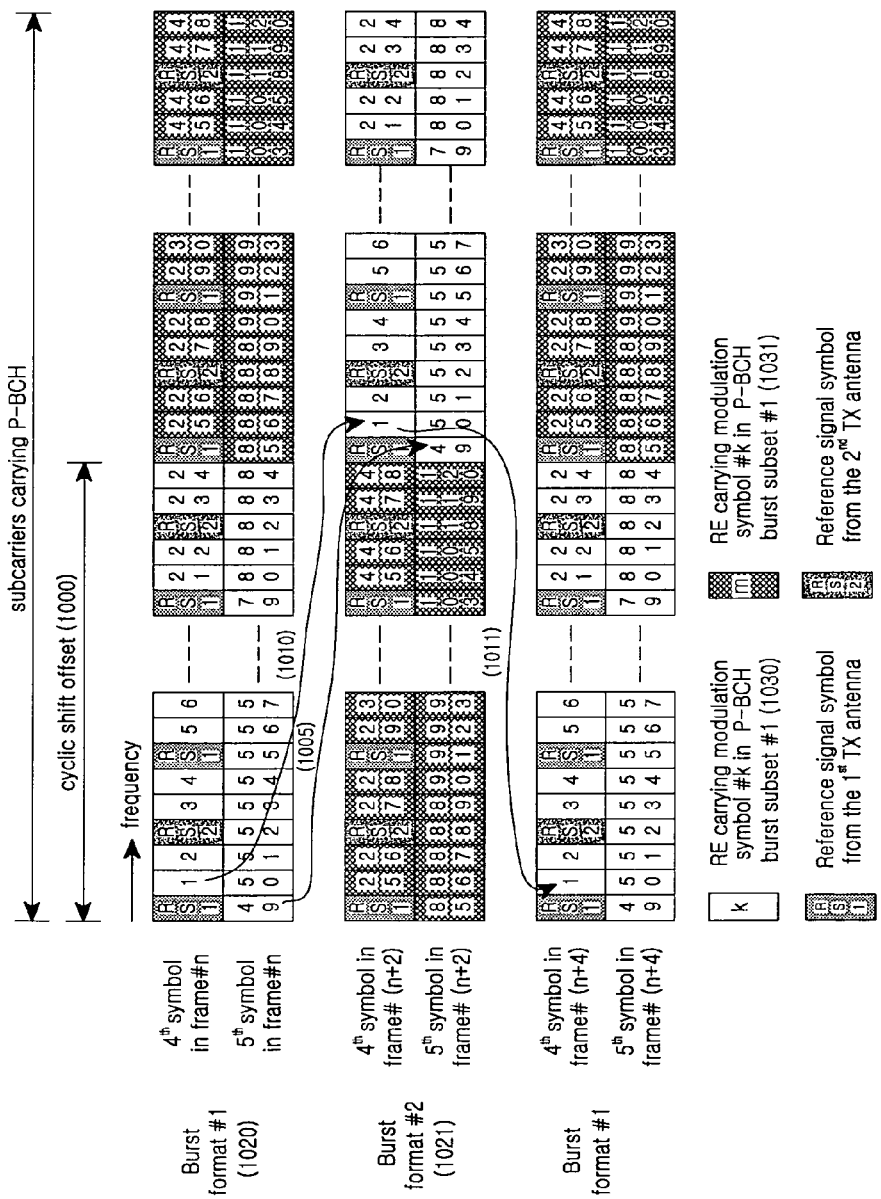
FIG. 10 is a diagram illustrating a cyclic shift being applied between P-BCH bursts according to the second embodiment of the present invention.

In order to more clearly illustrate the differences, the second embodiment of the present invention being applied using the case illustrated FIG. 3 is illustrated in FIG. 10. The most noticeable difference with the example illustrated in FIG. 4 is in that a cyclic shift value 1000 between bursts is 36, which is twice that of the example illustrated in FIG. 4. That is, because only two bursts are transmitted in 40-ms TTI at intervals of 20 ms, the bursts transmitted in the start frame of every TTI has a burst format #1 1020 as the cyclic shift offset is applied between bursts. For example, while a P-BCH modulation symbol #1 of a subframe #n is mapped in subframe #(n+2) to an RE, which is right-shifted by 36 subcarriers in the same OFDM symbol period as indicated by reference numeral 1010, it is mapped to an RE back in the subframe #n, in a subframe #(n+4). Similarly, a P-BCH modulation symbol #49 is also mapped after being shifted by 36 subcarriers between subframe #n and the subframe #(n+2) as indicated by reference numeral 1005. As described above, the symbols are mapped in order of subset #1 1030 and subset #2 1031 in the frequency domain in the first burst in a TTI, and the symbols are mapped in order of subset #2 1031 and subset #1 1030 in the second burst.

As can be seen in the foregoing embodiments, as the cyclic shift offset is determined according to the number of bursts transmitted within a P-BCH TTI and the burst formats are repeated on a TTI-by-TTI basis, P-BCH timing detection and decoding is possible with a small number of bursts and with low calculation complexity at the UE receiver. The following third embodiment, unlike the foregoing embodiments, applies a cyclic shift value between bursts in both the time and frequency domains.

Figure 11:
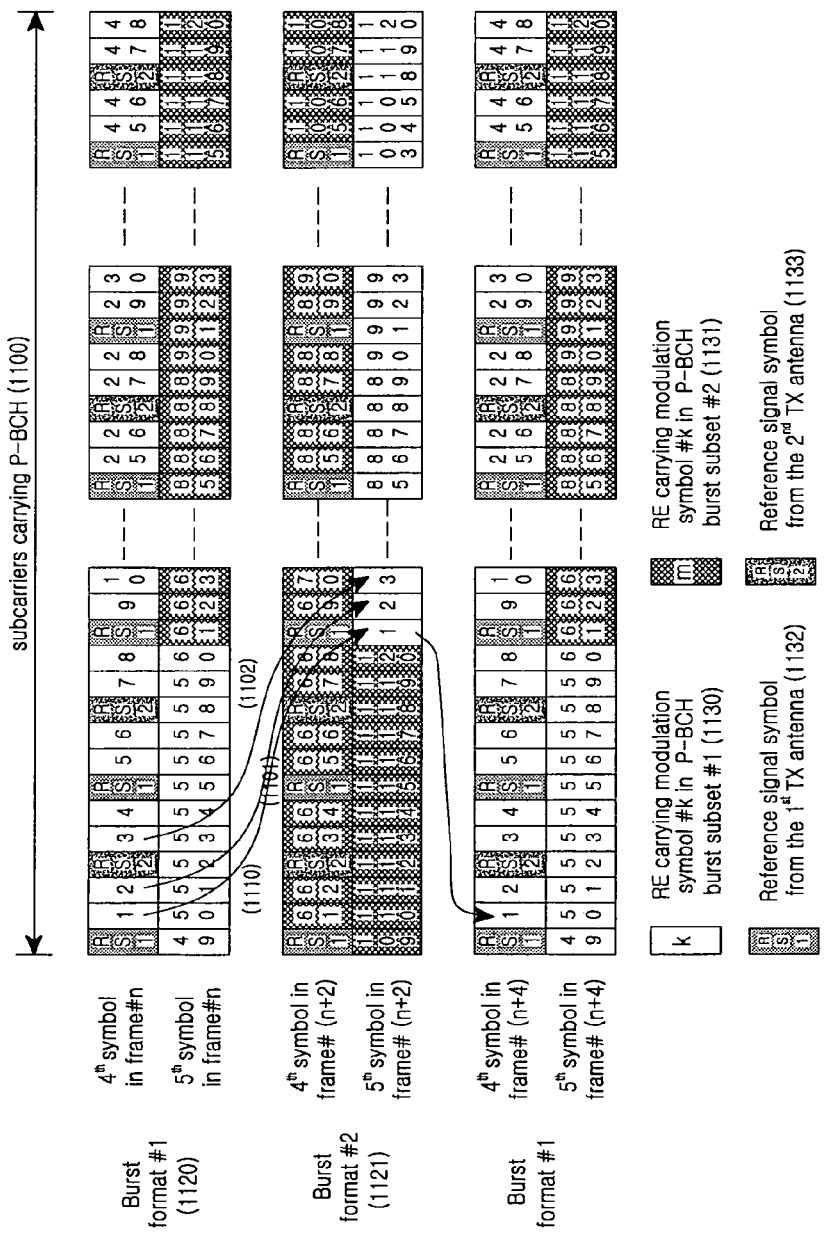
FIG. 11 is a diagram illustrating a cyclic shift being applied between P-BCH bursts according to a third embodiment of the present invention.

FIG. 11 is a diagram illustrating a cyclic shift being applied between P-BCH bursts according to the third embodiment of the present invention. In this case, as illustrated in FIG. 9, P-BCH bursts are transmitted only in the first and third frames 900 and 903 in a TTI, and are not transmitted in the second and fourth frames 904 and 905. Although two P-BCH bursts are transmitted in the TTI herein for ease of explanation, by way of example, the same can be applied even for the case where an arbitrary number of P-BCH bursts are transmitted.

Referring to FIG. 11, a burst format #1 1120 is applied to the first frame in a TTI, and a burst format #2 1121 is applied to the third frame in the TTI. For the two burst formats, a cyclic shift offset of 60 REs are applied therebetween, except for REs 1132 and 1133, which are carrying pilot symbols. That is, P-BCH subset #1 1130 and subset #2 1131 each include 60 REs carrying P-BCH modulation symbols. Therefore, in the first burst 1120 in the TTI, as 60 modulation symbols constituting a subset #1 1130 are sequentially mapped beginning from the left RE of the first OFDM symbol in the burst, except for the REs carrying pilot symbols, a $60^{th}$ modulation symbol is mapped to a $12^{th}$ RE of the second OFDM symbol in the burst and subsequently, 60 modulation symbols constituting a subset #2 1131 are sequentially mapped. In the second burst 1121, because a cyclic shift of 60 REs is applied to the REs, except for the REs carrying pilot symbols, the modulation symbols constituting the subset #2 1131 are mapped preferentially.

A fourth embodiment applies the present invention when REs to which pilot symbols are mapped change on a frame-by-frame basis. In the fourth embodiment, the present invention is applied when REs to which pilot symbols are mapped, change on a frame-by-frame basis, i.e., pilot symbols undergo frequency hopping. Like in the first embodiment, it is assumed herein that four P-BCH bursts are transmitted at intervals of 10 ms in a P-BCH TTI as illustrated in FIG. 3.

Figure 12:
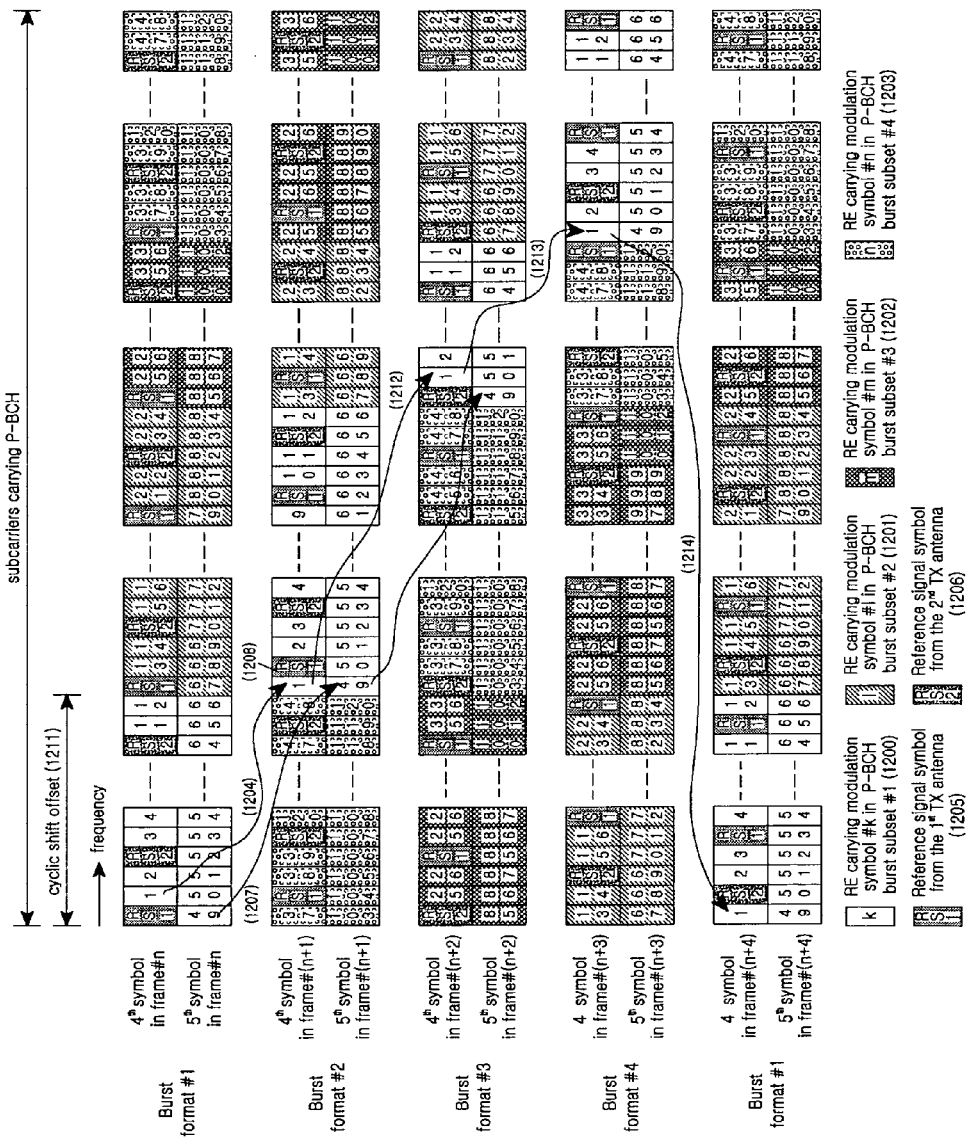
FIG. 12 is a diagram illustrating a cyclic shift being applied between P-BCH bursts according to a fourth embodiment of the present invention.

Referring to FIG. 12, REs to which pilot symbols #1 1205 and #2 1206 are mapped are different between frames, and a constant interval is maintained between RS1 and RS2. Even when pilot symbols undergo frequency hopping in this way, the technology proposed by the present invention can be applied in the same way.

That is, even the fourth embodiment, like the first embodiment, applies a predetermined cyclic shift between consecutive bursts. For example, a modulation symbol #49 is mapped in a frame #(n+1) after right-shifted from the frame #n by 18 REs, as indicated by reference numeral 1207. Similarly, even other modulation symbols belonging to the "$5^{th}$ symbol" period are mapped after being right cyclic-shifted by 18 REs between the consecutive bursts. However, for a modulation symbol #1, with reference to reference numerals 1204, 1212, 1213, and 1214, an 18-RE cyclic shift interval is correctly maintained between the bursts, because positions of pilot symbols 1205 and 1206 change between frames. However, for a "$4^{th}$ symbol" interval to which the modulation symbol #1 belongs, a 12-RE cyclic shift interval is always maintained between bursts, when symbols, except for pilot symbols 1205 and 1206, are considered. That is, even when frequency hopping is applied to pilot symbols as illustrated in FIG. 12, a cyclic shift is achieved between bursts in units of P-BCH burst subset #1 1200, subset #2 1201, subset #3 1202, and subset #4 1203. When modulation symbols of the subsets are mapped to REs, the modulation symbols are sequentially mapped to REs, except for the pilot symbols 1205 and 1206, in the corresponding OFDM symbol interval.

Figure 13:
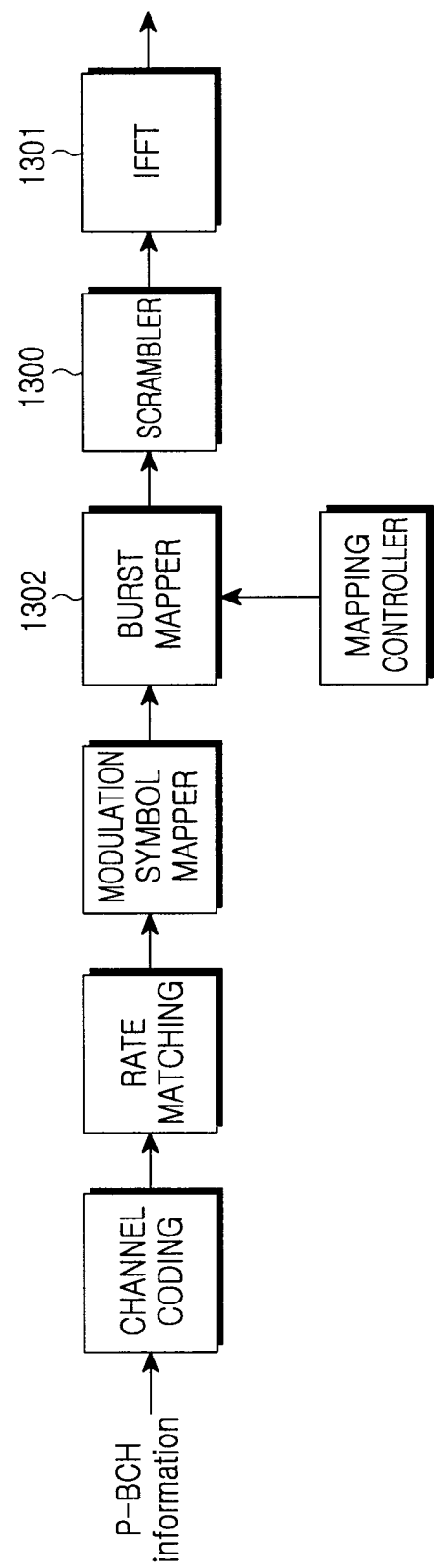
FIG. 13 is a diagram illustrating a structure of a base station transmission apparatus according to a preferred embodiment of the present invention.

FIG. 13 illustrates a structure of a base station transmission apparatus according to a preferred embodiment of the present invention. A difference with the transmission apparatus illustrated in FIG. 5 is in that a scrambler 1300 is situated in front of an IFFT 1301. That is, the scrambler 1300 performs scrambling on the modulation symbols after they undergo cyclic shifting by means of a burst mapper 1302. Therefore, this structure, as compared with the structure illustrated in FIG. 5, can obtain improved processing gain when a receiver soft-combines the bursts of same information symbols.

Figure 14:
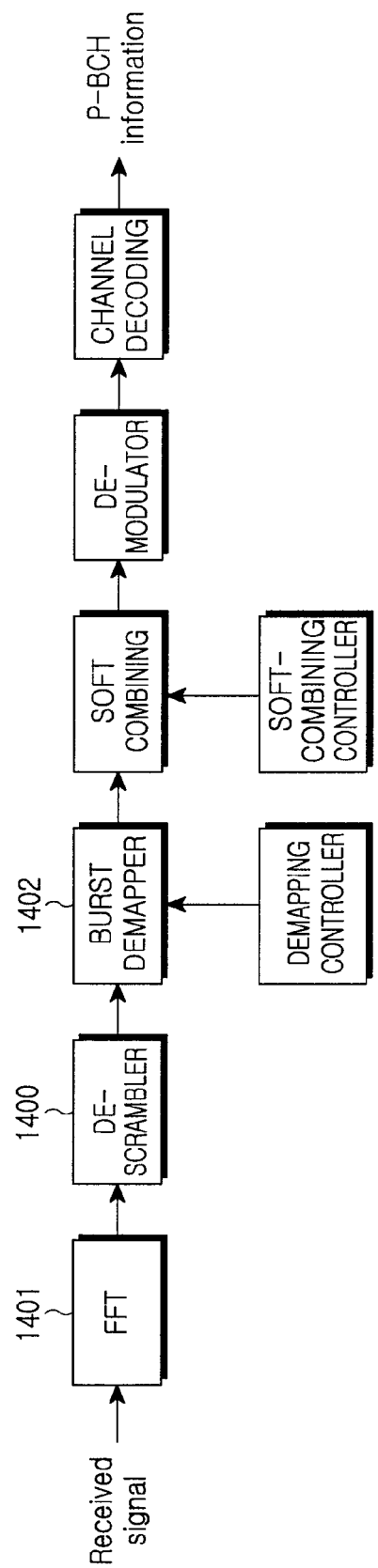
FIG. 14 is a diagram illustrating a structure of a UE reception apparatus according to a preferred embodiment of the present invention.

FIG. 14 illustrates a structure of a UE reception apparatus for decoding a P-BCH transmitted through the transmission apparatus illustrated in FIG. 13. As a descrambler 1400 is situated between a FFT 1401 and a burst demapper 1402, burst demapping is performed after descrambling is performed on the received symbols output from the FFT 1401.

Figure 15:
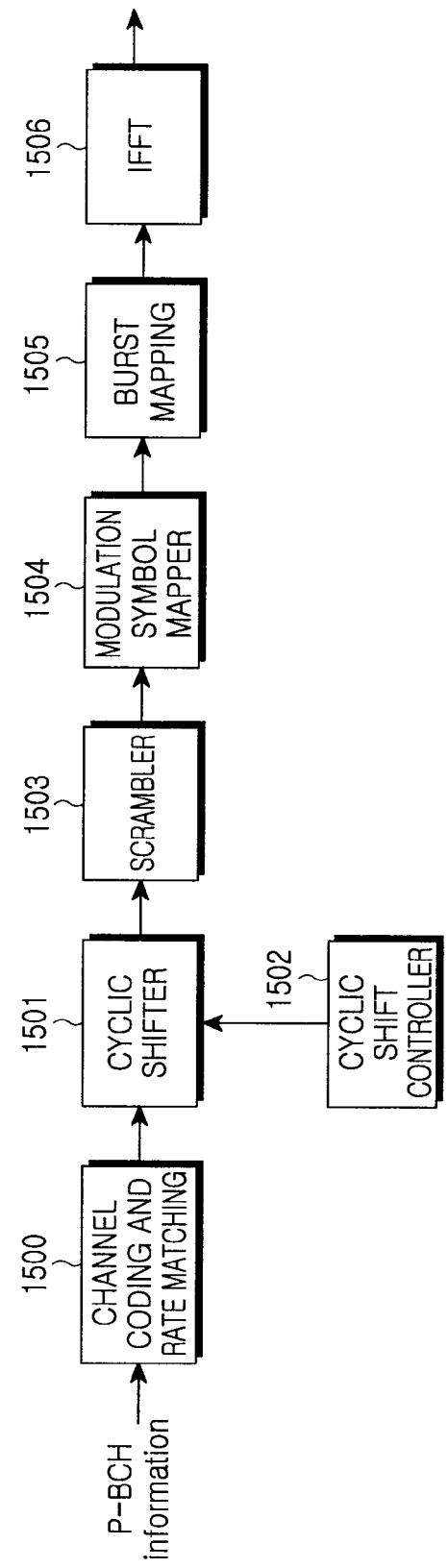
FIG. 15 is a diagram illustrating a structure of a base station transmission apparatus according to a fifth embodiment of the present invention.
Figure 16:
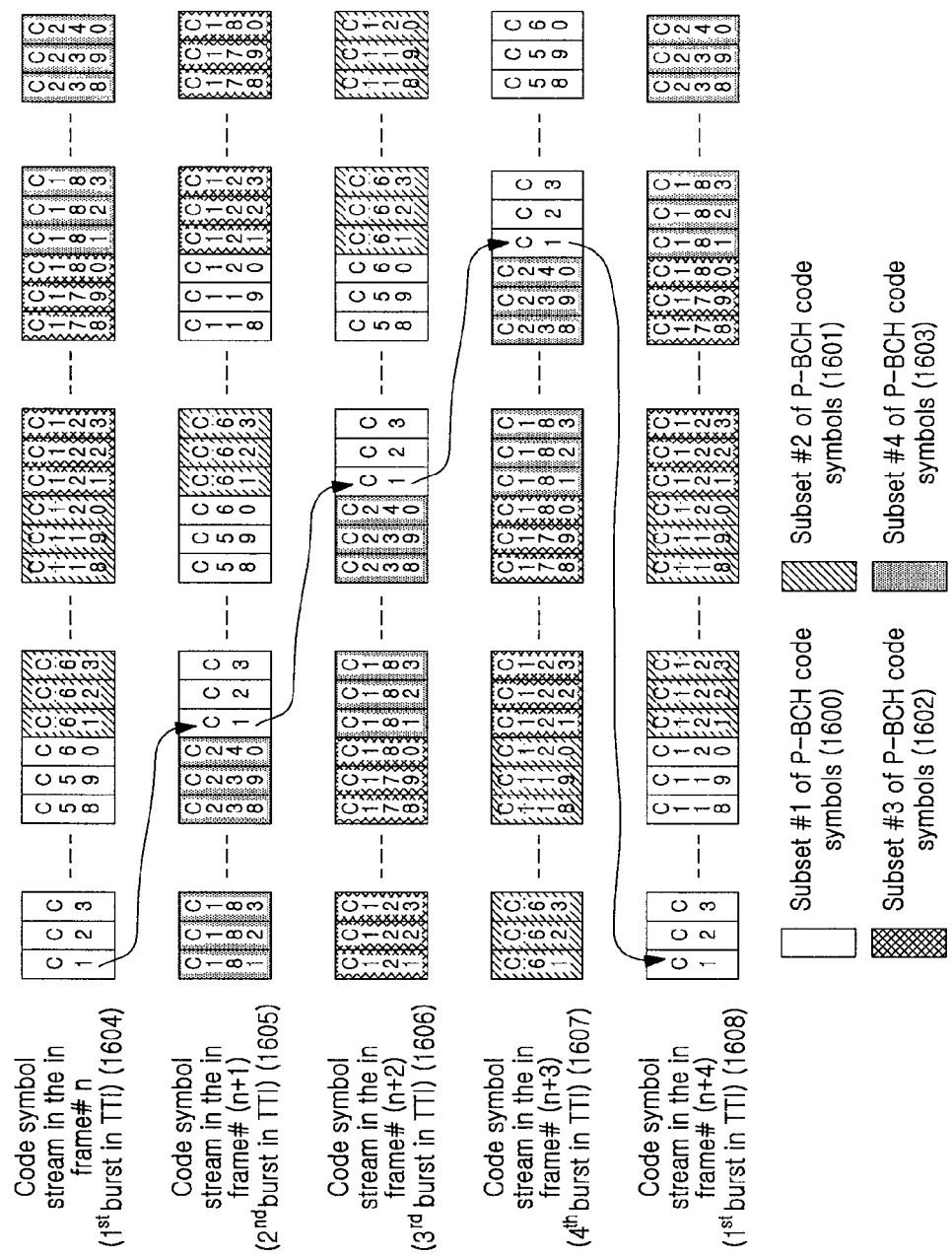
FIG. 16 is a diagram illustrating a cyclic shift being applied between P-BCH bursts according to the fifth embodiment of the present invention.

FIG. 15 illustrates a structure of a base station transmission apparatus according to a fifth embodiment of the present invention. A difference from the structure of the base station transmission apparatus illustrated in FIG. 5 according to the first embodiment of the present invention is in that cyclic shift between P-BCH bursts is achieved for the code symbols output from a channel coding and rate matching unit 1500. A cyclic shifter 1501, under the control of a cyclic shift controller 1502, applies a corresponding cyclic shift value for a code symbol stream output from a channel coding and rate matching unit 1500 according to positions of transmission P-BCH bursts in a 40-ms TTI as illustrated in FIG. 16. The cyclic shifter 1501 may also apply another cyclic shift between bursts when performing channel interleaving in the channel coding and rate matching unit 1500. The code symbol stream output from the cyclic shifter 1501 is transmitted after undergoing Inverse Fourier Transform in IFFT 1506, after passing through a scrambler 1503, a modulation symbol mapper 1504, and burst mapping unit 1505. In the transmission apparatus structure illustrated in FIG. 15, because a cyclic shift is applied for the code symbol stream, the burst mapper 1505 applies the same mapping rule between bursts, unlike the burst mapper 505 illustrated in FIG. 5. This is because the code symbol stream is mapped to REs, after naturally being cyclic-shifted between bursts by an operation of the cyclic shifter 1501. However, the present invention has no restriction for the case where the burst mapper 1505 additionally applies another RE mapping between bursts.

In the example illustrated in FIG. 16, like in the case of the first embodiment illustrated in the FIG. 4, it is assumed that four bursts are transmitted every 10 ms during a 40-ms TTI, and the bursts include 120 QPSK modulation symbols. Therefore, the number of code symbols in the code symbol stream output from the channel coding and rate matching unit 1500 is 240, and the code symbols are expressed with indexes $c1, c2, \ldots, c240$. The code symbol stream can be divided into subset #1 1600, subset #2 1601, subset #3 1602, and subset #4 1604, which include the same number of code symbols. As illustrated in FIG. 16, for example, the subset #1 1600 is defined as 60 code symbols, which are mapped in order of $c1, c2, \ldots, c60$, and similarly, the other subsets 1601, 1602, and 1603 are also include 60 code symbols as is illustrated in FIG. 16. Therefore, for the burst 1604 transmitted in a frame #n, a code symbol stream is made in order of subset #1, subset #2, subset #3, and subset #4, and for the burst 1605 transmitted in the next frame #(n+1), a code symbol stream is made in order of subset #4, subset #1, subset #2, and subset #3, after being right cyclic-shifted (1610) by 60 code symbols. Similarly, even for the bursts 1606, 1607, and 1608 transmitted in the next frames, a code symbol stream is transmitted after being right cyclic-shifted by 60 code symbols between bursts of the consecutive frames. Therefore, the P-BCH burst 1608 of the frame #(n+4), which is turning back to the start point of the 40-ms TTI, is equal to the burst 1604 of the frame #n in terms of code symbol order in the code symbol stream.

Figure 17:
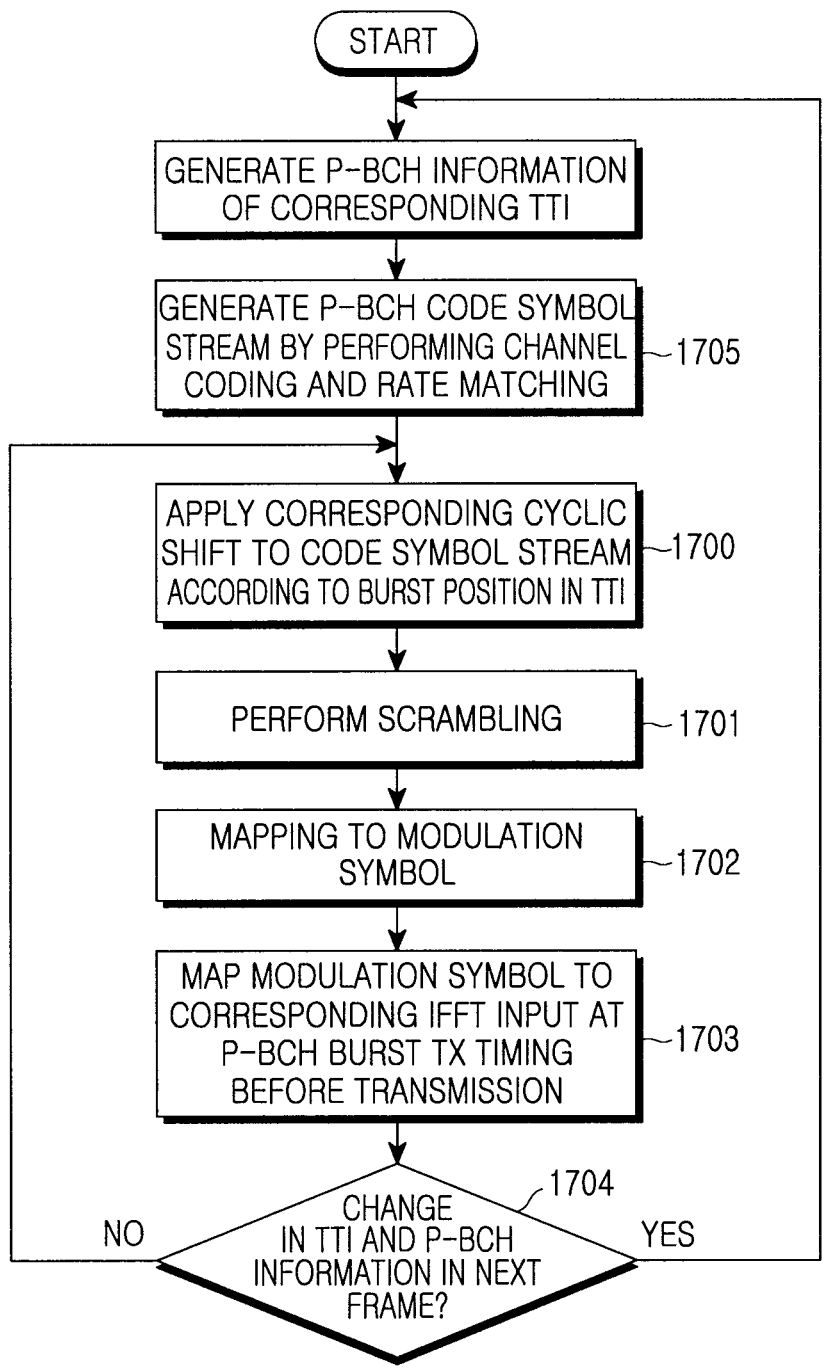
FIG. 17 is a diagram illustrating a base station transmission procedure according to the fifth embodiment of the present invention.

FIG. 17 illustrates a base station transmission procedure according to the fifth embodiment of the present invention. Referring to FIG. 17, as described above, a base station performs channel coding and rate matching to generate a code symbol stream in step 1705, and applies the corresponding cyclic shift to the code symbol stream according to the position of the burst currently transmitted in TTI, in step 1700. The base station applies scrambling to the code symbol stream in step 1701, and maps the code symbols to the modulation symbols in step 1702. Thus, in step 1703, the base station maps the modulation symbols to the corresponding IFFT inputs at a transmission timing of the P-BCH burst before transmission. In step 1704, the base station determines whether a TTI changes in the next frame and is different in P-BCH information compared with the previous TTI. If not so, the process returns to step 1700 where the base station applies to the code symbol stream the cyclic shift, which is suitable for the bursts it will transmit in the corresponding frame.

Figure 18:
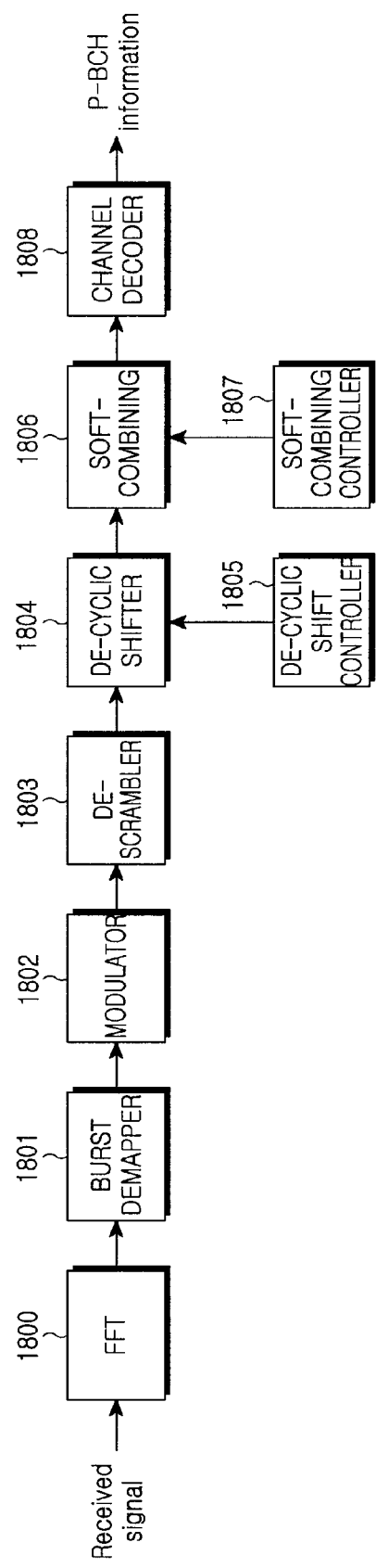
FIG. 18 is a diagram illustrating a structure of a UE reception apparatus according to the fifth embodiment of the present invention.

FIG. 18 illustrates a structure of a UE reception apparatus according to the fifth embodiment of the present invention. Referring to FIG. 18, a received signal is transformed into a code symbol stream through IFFT 1800, a burst demapper 1801, and a modulator 1802. The code symbol stream includes soft symbols extracted by the modulator 1802. The burst demapper 1801 extracts only the P-BCH symbols from symbols of several channels, output from the IFFT 1800, when RE mapping of a P-BCH is equal between bursts. A de-cyclic shifter 1804, under the control of a de-cyclic shift controller 1805, inversely applies the cyclic shift applied in the transmitter, for the code symbol stream of bursts received in a corresponding frame, to match it with the code symbol stream of the previously received bursts in terms of positions of code symbols. A soft-combining unit 1806 soft-combines the currently received code symbol stream with the code symbol stream stored in a soft buffer, and stores the soft-combined code symbol stream in the buffer. A soft-combining controller 1807 resets the soft-combining unit 1806 when necessary. A channel decoder 1808 applies several possible cyclic shift values for the code symbol stream soft-combined by the soft-combining unit 1806 to determine a position of the currently received burst in a P-BCH TTI from the cyclic shift value it has successfully decoded, and acquires P-BCH information.

Figure 19:
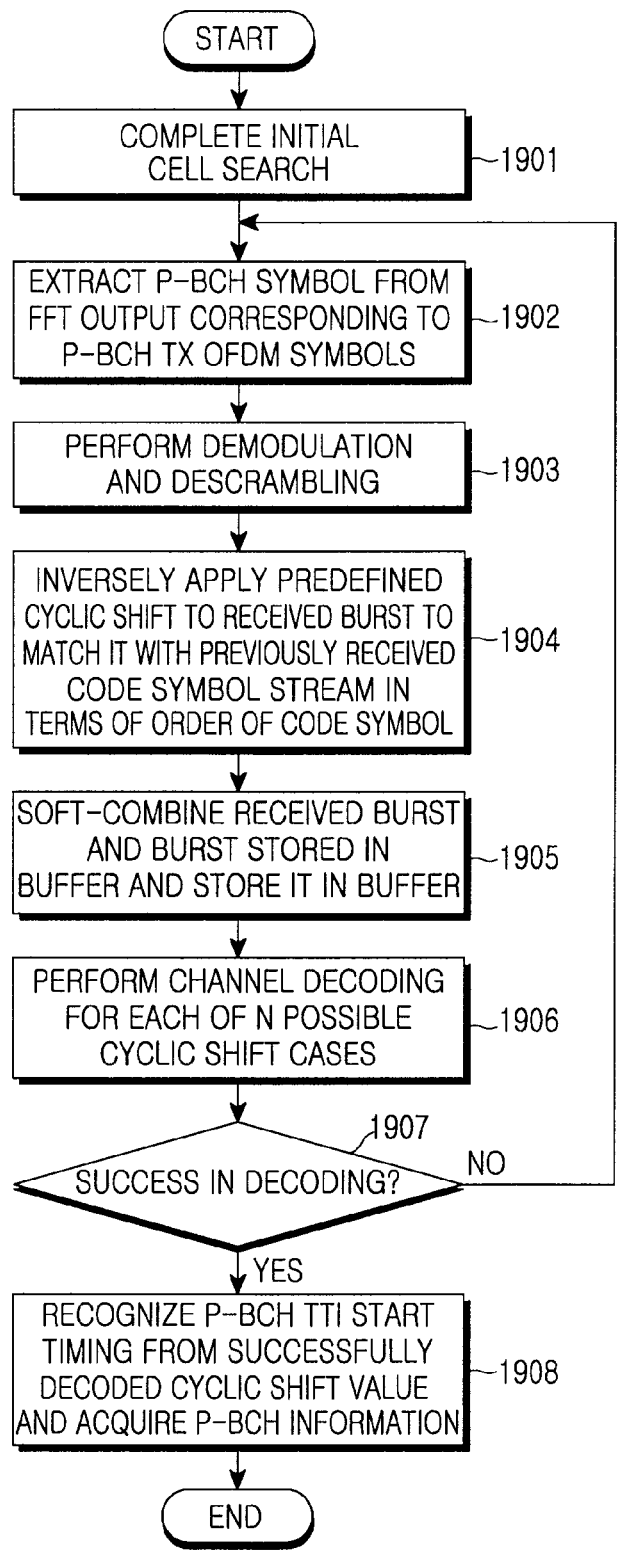
FIG. 19 is a diagram illustrating a UE reception procedure according to the fifth embodiment of the present invention.

FIG. 19 illustrates a UE reception procedure according to the fifth embodiment of the present invention. Referring to FIG. 19, after completing an initial cell search in step 1901, a UE obtains a descrambled code symbol stream through steps 1902 and 1903. In step 1904, the UE inversely applies a predefined cyclic shift to the received burst to match it with the previously received code symbol stream in terms of orders of code symbols. For example, in the example illustrated in FIG. 16, the cyclic shift value is 60. In step 1905, the UE soft-combines the received burst with the burst stored in the buffer, and stores the soft-combined burst in the buffer. In step 1906, the UE performs channel decoding on the soft-combined burst for each of N possible cyclic shift cases. In the example illustrated in FIG. 16, because there are four possible cyclic shift values, N=4. In step 1907, the UE determines if it has successfully decoded. Upon determining a failure in the decoding, the process returns to step 1902 where the UE receives again a new burst. However, upon a successful decoding, the LE recognizes a TTI start timing of a P-BCH from the successfully decoded cyclic shift value and acquires P-BCH information in step 1908.

As is apparent from the foregoing description, in transmitting common control channels, such as a P-BCH, in the mobile communication system, the present invention maps P-BCH symbols to physical resources, after applying a fixed cyclic shift between consecutive bursts, thereby making it possible to acquire a timing of the P-BCH and decode P-BCH information with low complexity, even when a TTI of the common control channels is greater than an interval of frame synchronization acquired through synchronization channels.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting a common control channel in an Orthogonal Frequency Division Multiplexing (OFDM) mobile communication system, the method comprising:
generating Primary Broadcasting Channel (P-BCH) information to transmit in a corresponding Transmission Time Interval (TTI);
generating P-BCH code symbols by performing channel coding and rate mapping on the P-BCH information;
mapping the P-BCH code symbols to modulation symbols;
generating P-BCH bursts by applying a predetermined cyclic shift offset; and
transmitting the generated bursts to a receiver,
wherein the bursts include resource elements for carrying modulation symbols and reference signal symbols, and
wherein the predetermined cyclic shift offset is applied between consecutive P-BCH bursts and determined according to positions of the P-BCH bursts in the TTI.

2. The method of claim 1, wherein the predetermined cyclic shift offset is determined according to a number of bursts transmitted during the TTI of the common control channel.

3. The method of claim 1, further comprising:
generating bursts that are shifted in at least one of a frequency domain and a time domain by applying a predetermined cyclic shift offset between the bursts.

4. A method for receiving a common control channel in an Orthogonal Frequency Division Multiplexing (OFDM) mobile communication system, the method comprising:
completing an initial cell search;
extracting Primary Broadcasting Channel (P-BCH) symbols from corresponding Fast Fourier Transform (FFT) outputs at an OFDM symbol timing;
applying an inverse predetermined cyclic shift offset to a received P-BCH burst;
soft-combining the received P-BCH burst with a P-BCH burst received in a previous frame;
decoding the soft-combined bursts; and
detecting a Transmission Time Interval (TTI) start timing of a P-BCH from the predetermined cyclic shift offset of a successfully decoded burst,
wherein the start timing is detected according to position information of the P-BCH bursts that are shifted by applying a predetermined cyclic shift offset between consecutive P-BCH bursts, and
wherein the P-BCH bursts include resource elements for carrying modulation symbols and reference signal symbols.

5. The method of claim 4, wherein the predetermined cyclic shift offset is determined according to a number of bursts transmitted.

6. The method of claim 5, wherein the received burst is shifted in one of a frequency domain and a time domain by applying the predetermined cyclic shift offset between the received bursts.

7. An apparatus for transmitting a common control channel in an Orthogonal Frequency Division Multiplexing (OFDM) mobile communication system, the apparatus comprising:
a channel coding unit for generating P-BCH code symbols by performing channel coding and rate mapping on input Primary Broadcasting Channel (P-BCH) information;
a modulation symbol mapper for mapping the P-BCH code symbols to modulation symbols;
an Inverse Fast Fourier Transform (IFFT) mapper for, when a plurality of bursts are transmitted during a Transmission Time Interval (TTI) of the common control channel, generating P-BCH bursts by applying a predetermined cyclic shift offset to the modulation symbols, and mapping the generated bursts in a resource block; and
a transmission unit for transmitting the mapped bursts to a receiver,
wherein the bursts include resource elements for carrying modulation symbols and reference signal symbols, and
wherein the predetermined cyclic shift offset is applied between consecutive P-BCH bursts and determined according to positions of the P-BCH bursts in the TTI.

8. The apparatus of claim 7, wherein the predetermined cyclic shift offset is determined according to a number of bursts transmitted during the TTI of the common control channel.

9. The apparatus of claim 7, wherein the IFFT mapper generates bursts that are shifted in at least one of a frequency domain and a time domain by applying a predetermined cyclic shift offset between the bursts.

10. An apparatus for receiving a common control channel in an Orthogonal Frequency Division Multiplexing (OFDM) mobile communication system, the apparatus comprising:
- a reception unit for receiving a Primary Broadcasting Channel (P-BCH) burst;
- a channel compensation unit for extracting P-BCH symbols from corresponding Fast Fourier Transform (FFT) outputs at an OFDM symbol timing;
- a combining unit for soft-combining the received P-BCH burst with a P-BCH burst stored in a buffer;
- a burst demapper for applying an inverse predetermined cyclic shift offset to a received P-BCH burst; and
- a decoder for decoding each of the soft-combined bursts, and upon a successful decoding, detecting a Transmission Time Interval (TTI) start timing of a P-BCH from the predetermined cyclic shift offset of a successfully decoded burst,
- wherein the start timing is detected according to position information of the P-BCH bursts that are shifted by applying a predetermined cyclic shift offset between consecutive P-BCH bursts, and
- wherein the P-BCH bursts include resource elements for carrying modulation symbols and reference signal symbols.

11. The apparatus of claim 10, wherein the predetermined cyclic shift offset is determined according to a number of bursts transmitted.

12. The apparatus of claim 11, wherein the received burst is shifted in one of a frequency domain and a time domain by applying the predetermined cyclic shift offset between the received bursts.

* * * * *